Jan. 29, 1929.
C. W. A. VAN BERGEN
1,700,659
MEASURING DEVICE
Filed Dec. 7, 1927
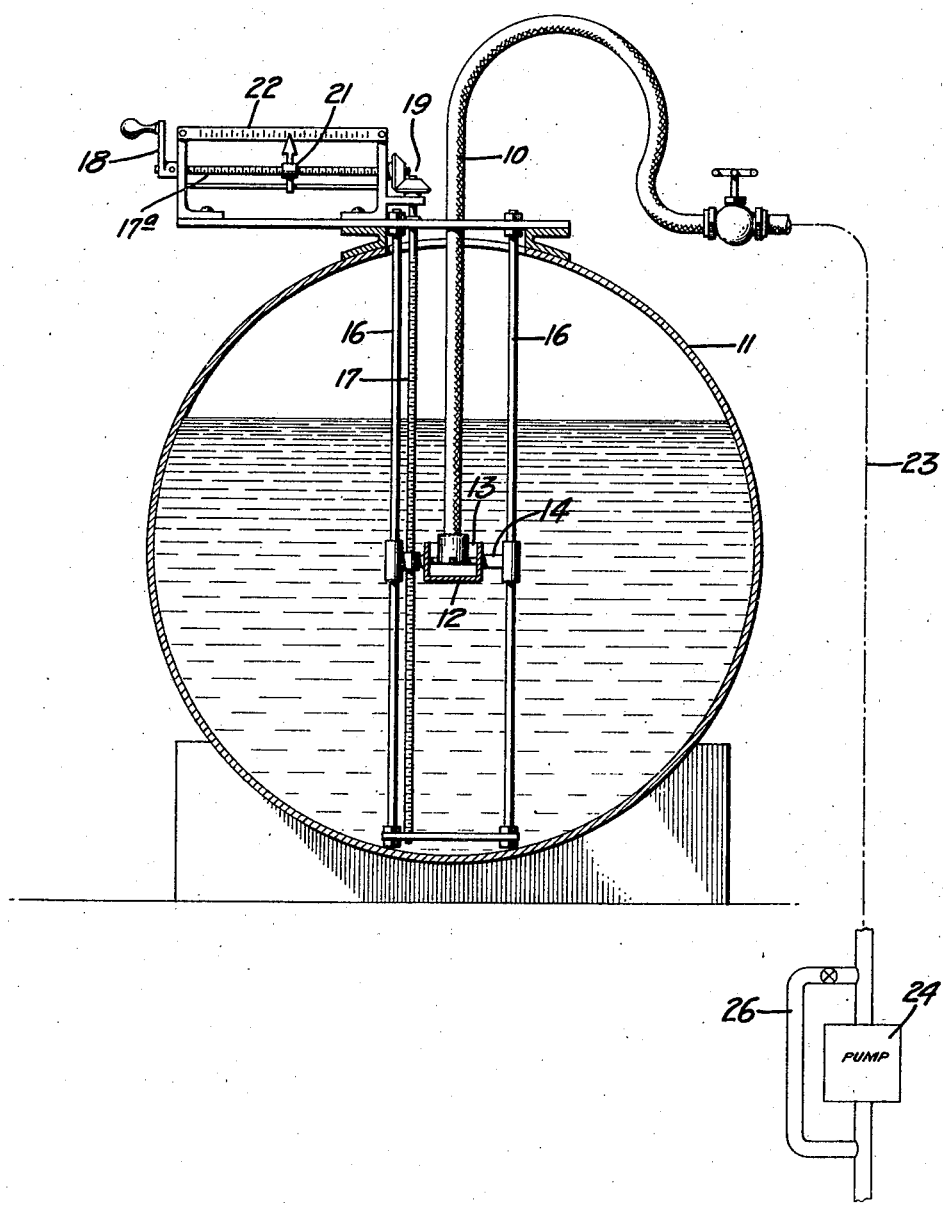
INVENTOR
Charles Willem Adriaan van Bergen
ATTORNEYS Patented Jan. 29, 1929.

1,700,659

UNITED STATES PATENT OFFICE.

CHARLES WILLEM ADRIAAN van BERGEN, OF THE HAGUE, NETHERLANDS, ASSIGNOR TO SIMPLEX REFINING COMPANY, OF SAN FRANCISCO, CALIFORNIA, A COMPANY OF CALIFORNIA.

MEASURING DEVICE.

Application filed December 7, 1927, Serial No. 238,263, and in The Netherlands August 3, 1926.

This invention relates generally to devices for removing measured quantities of liquid from tanks or reservoirs. It is particularly adapted to handling inflammable liquids such as naphthalene, kerosene or gasoline.

It is an object of this invention to devise means for removing measured quantities of liquid from a tank, which will be more accurate and may be more readily adjusted to vary the quantity of liquid to be removed.

It is a further object of this invention to generally improve upon the accuracy of devices for removing major quantities of liquid from tanks.

It is a further object of this invention to devise an apparatus of the class described which will be constructed in such a manner as to obviate leakage of volatile and inflammable liquids.

It is a further object of this invention to devise an apparatus which will directly indicate to an operator the amount of liquid to be withdrawn from a tank.

Further objects of this invention will appear from the following description in which I have set forth the preferred embodiment of my invention. It is to be understood that the scope of the appended claims is to be determined by the state of the prior art.

Referring to the drawing; the single view shows a liquid tank in cross section with the device of this invention applied for the purpose of removing measured quantities of liquid.

In removing volatile liquids such as benzine or gasoline from shipping or storing tanks, it has been found that accurate measurement of the liquid removed cannot be secured by the use of ordinary flow meters, as such meters are not reliable and are frequently rendered inaccurate because of the formation of gas bubbles. It has previously been proposed to dispense with the use of meters by siphoning or otherwise withdrawing the liquid thru a conduit having its intake end adjustable within the tank. It is this type of apparatus to which my invention relates and is an improvement.

Referring to the drawing the invention as illustrated comprises a conduit 10 which may be lowered within a tank 11, from which it is desired to remove measured quantities of liquid. To obviate the leakage which may be caused by the use of hinged joints, I preferably construct the conduit 10 of flexible pipe thereby permitting convenient adjustment of the inner lower end thereof. The intake opening into this conduit 10 is faced upwardly and therefore a tray 12 is preferably secured to the lower end of conduit 10 so as to provide an upwardly faced horizontal annular opening or mouth 13.

In order to maintain the tray 12 in vertical position, it is preferably mounted upon a cross head 14 which is slidably disposed upon one or more guide rods 16. Vertical adjustment of the cross head 14 is secured by suitable mechanism, such as screw rod 17 which may be rotated externally of the tank, and which is in threaded engagement with the cross head 14. Externally of the tank, I have arranged suitable indicating means so that an operator may accurately determine the depth of the mouth of the conduit below the surface of the liquid. One suitable form of indicating means comprises a threaded rod 17$^a$ supplied with suitable motive means such as the hand crank 18, and operatively connected so as to rotate the threaded rod 17$^a$ as by means of gear connection 19. Having threaded engagement with the rod 17$^a$, there is a nut 21 carrying a pointer adapted to cooperate with a suitable scale 22.

In withdrawing the liquid thru conduit 10, I preferably utilize siphon means, altho a fluid plunger pump may also be employed. For example in the drawing I have shown conduit 10 connected to an outer siphon pipe 23, which is also associated with a liquid pump 24. The pump may be utilized merely for starting a flow of liquid thru the siphon, after which operation of the pump may be discontinued and liquid may be withdrawn by siphon action thru the pump bypass pipe 26.

In operating the device explained above, the tank from which liquid is to be withdrawn should be initially filled up to a given level corresponding to zero mark on scale 22 and for this purpose I may utilize any suitable indicating or detecting devices. The mouth of conduit 10 is then lowered into the tank to a certain distance below the surface of the liquid, depending upon the quantity of liquid which it is desired to remove. Scale 22 is preferably calibrated so that this quantity may be read off in direct figures. The siphoning of liquid may then be started by the pump 24 and will continue until the surface of the liquid drops to substantially the level of the lip of tray 12. When drawing off the liquid in this manner a whirlpool may be formed about the tray 12 which will arrest the siphoning action before the liquid level of the tank has reached the exact level of the tray 12. Therefore after the siphoning action has been stopped, the pump should be operated for a short time to suck or swill the rest of the liquid so as to reach a more exact level. By having the opening or mouth of conduit 10 face upwardly and in a horizontal plane, it is impossible to suck liquid after the liquid level has fallen even with the level of the lip of tray 12, and thus this apparatus is capable of more accurate measurement of liquids than would be the case if the opening faced downwardly or laterally.

It is obvious that the mechanism for raising and lowering the mouth of the conduit may be modified within the scope of this invention. Likewise many different forms of indicating means may be employed. It is preferable to calibrate the scale 22 so that the quantity of liquid removed may be directly determined by the operator. Therefore the scale divisions may vary in accordance with the shape of the tank. For example with a cylindrical tank as shown the divisions will be closer together at the ends of the scale.

I claim:

1. In a device for removing measured quantities of liquid from a tank, a conduit adapted to extend down within said tank, a tray positioned upon the lower end of the conduit thereby providing an upwardly faced opening for flow of liquid into the conduit, screw means for raising and lowering the lower end of the conduit, and means for indicating the position of the tray relative to the tank.

2. In a device for removing measured quantities of liquid from a tank, a conduit adapted to extend down within said tank, a tray positioned upon the lower end of the conduit thereby providing an upwardly faced opening for flow of liquid into the conduit, screw means operable externally of the tank for raising or lowering the lower end of the conduit, means for guiding said lower end whereby it is caused to move in a vertical path, and means for indicating the position of said tray relative to the tank.

3. In a device for removing measured quantities of liquid from a tank, a flexible conduit adapted to extend into a tank for removal of liquid, a tray nozzle secured over the inner end of said conduit, means for retaining said nozzle in upright position with its opening facing upwardly, means for raising and lowering said nozzle, and means for indicating the position of the nozzle relative to the tank.

4. In a device for removing measured quantities of liquid from a tank, a conduit adapted to extend down within said tank, a tray positioned upon the lower end of the conduit thereby providing an upwardly faced opening for flow of liquid into the conduit, means for raising and lowering the lower end of the conduit, and means for indicating the position of the tray relative to the tank.

In testimony whereof, I have hereunto set my hand.

CHARLES WILLEM ADRIAAN van BERGEN.